Aug. 30, 1949. V. SCHWARZKOPF 2,480,778
DUMP CAN
Filed March 8, 1946

Inventor:
Vergil Schwarzkopf,
By Dawson, Bortham Spangenberg
Attorneys.

Patented Aug. 30, 1949

2,480,778

UNITED STATES PATENT OFFICE 2,480,778

DUMP CAN

Vergil Schwarzkopf, La Grange, Ill., assignor to The Lathrop-Paulson Company, Chicago, Ill., a corporation of Illinois Application March 8, 1946, Serial No. 653,111

3 Claims. (Cl. 210—155)

This invention relates to a dump can for milk and other liquids, and is particularly useful with dairies, etc. The application constitutes a continuation-in-part of my co-pending application, Serial No. 592,233, which has matured into U. S. Patent No. 2,414,212, for Dump can.

In the use of dump cans, it has been customary to introduce a baffle device provided with spaced openings and extending over the bottom portion of the can, the purpose of the baffles being to prevent splashing of the milk out of the can when the milk is being poured. This anti-splashing device is expensive in construction, difficult to clean, and is not entirely satisfactory as an anti-splashing structure because the operator is still required to be very careful in the pouring of the milk to prevent splashing.

An object of the invention is to provide a dump can equipped with extremely simple means for preventing the splashing of milk when it is poured into the can, while at the same time providing strainer means at the bottom of the can. A further object is to provide a dump can equipped with a removable strainer, the strainer having walls formed therewith which prevent the splashing of milk when it is poured into the can. Yet another object is to provide a dump can equipped with a strainer tray, the strainer tray having upwardly and inwardly-inclined extensions which prevent the splashing of milk within the can, while at the same time providing handles for the removal of the tray. Other specific objects and advantages will appear as the specification proceeds.

The invention is illustrated, in a preferred embodiment, by the accompanying drawing, in which—

Figure 1:
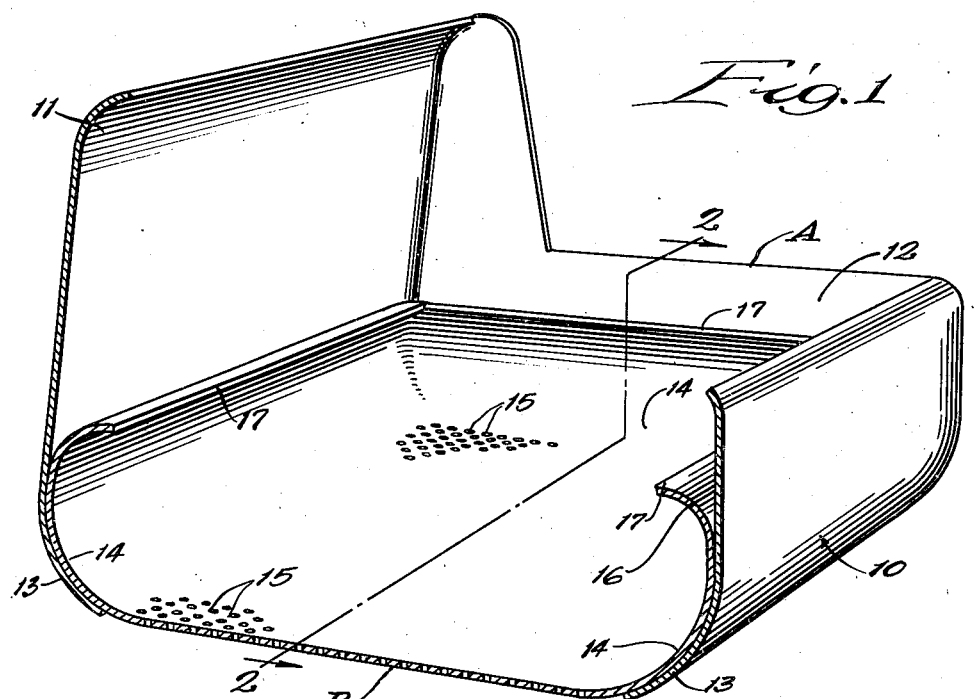
Figure 2:
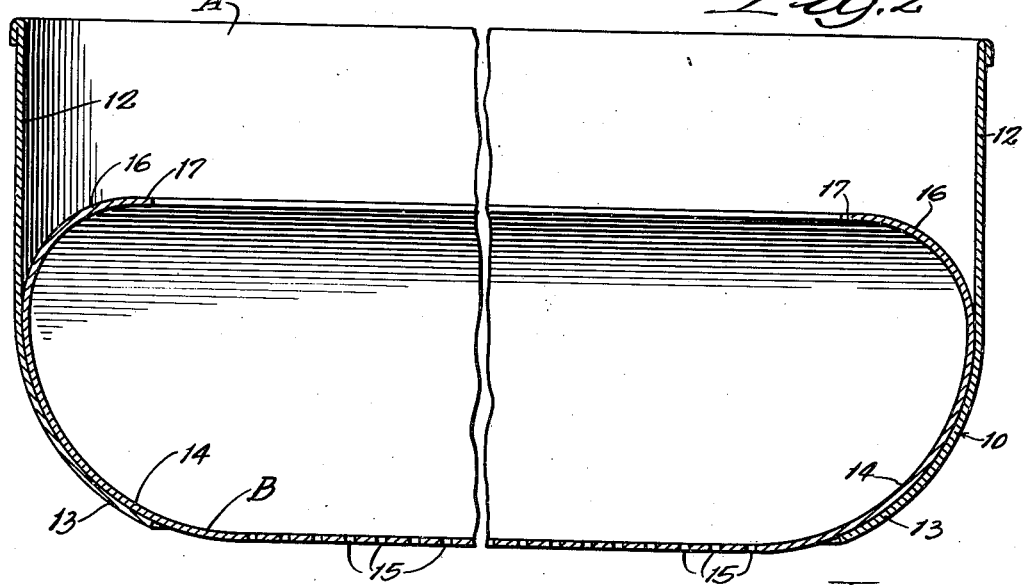

Figure 1 is a transverse sectional view of a dump can embodying my invention; and Fig. 2, a broken longitudinal sectional view, the section being taken as indicated at line 2 of Fig. 1.

In the illustration given, A designates a dump can structure; and B, a perforated tray providing the bottom wall of the dump can.

The structure A, except for the absence of an integral bottom wall and the termination of the side walls to form inwardly-turned ledges, is a typical dump can as now used in the dairy industry and need not, therefore, be described in detail. The side walls 10 are all of the same shape and construction, except for the rear wall 11 which is considerably higher and provides an elevated shield or rest. The side walls 12, as shown more clearly in Fig. 2, are preferably straight to permit removal of the tray B.

In the construction shown, the lower portion of each side wall is curved at 13 to provide an inwardly-extending ledge and wall termination after extending a short distance inwardly, thus providing an open vent in the bottom of the can.

The tray B may be of any suitable form or construction. In the illustration given, the tray is provided with a rounded portion 14 which fits snugly within the rounded ledge 13, and the portion of the tray extending over the vent in the lower portion of the structure A is preferably equipped with perforations 15 so as to provide a strainer bottom wall for the can. The size of the perforations varies considerably in use and may be of any suitable size depending upon the straining results desired.

The tray B extends upwardly a few inches and then curves inwardly at 16 until it has reached a substantially horizontal plane at 17. I prefer to have the tray B equipped with the inwardly-extending portions 16 and 17 on all sides, but it will be understood that for some pouring operations and special uses, such portions may be omitted along one side or a portion thereof. The inwardly-extending portions 17 provide a ready handle to facilitate the removal of the tray for cleaning or for the removal of objects held by the strainer bottom.

Operation

In the operation of the device, milk, etc. is dumped into the can and, upon striking the tray B, rolls up the side and is directed backwardly into the body of the milk by the guides 16 and 17. Should the operator increase the amount of milk poured into the tray, there is still no splashing, and the increased volume of the milk which rolls upwardly and then downwardly into the tray seems to increase the protection against splashing because the roll of milk, as it moves first inwardly from the guide 17 and then downwardly, forms in itself a baffle preventing the splashing of the newly-received increment of milk. Thus, the simple structure described serves not only to prevent the splashing outwardly of a small quantity of milk poured into the tray, but presents an even greater resistance to splashing as the volume of milk poured into the tray increases.

When it is desired to clean the tray, the operator can grasp the member 17 along one side and raise it along the straight wall 12 to quickly remove the tray. It is thus not necessary to remove the entire dump can, as was formerly the practice, to remove foreign materials within the strainer. Instead, the small tray B may be readily removed and replaced within the can structure A.

While I have shown the tray B equipped with the inwardly-turned portions 16 and 17, which are effective as anti-spray devices and also provide a handle for the tray, it will be understood that the inwardly-turned members 16 and 17 may, if desired, be formed as a separate structure and as part of the side walls 10. I prefer, however, to have the structure as described in which the tray B has integrally formed therewith the inwardly-turned portions 16 and 17 which enable the tray to be quickly removed while at the same time providing the protection against splashing.

While in the foregoing specification I have set forth one embodiment of the invention in great detail for the purpose of illustrating the same, it will be understood that such details may be varied widely by those skilled in the art without departing from the spirit of my invention.

I claim:

1. A dump can comprising a receptacle having upwardly-extending side walls, the lower portions of the side walls terminating in inwardly-extending retaining ledges, and a tray seated within said ledges and equipped with perforations in the bottom thereof to provide a bottom strainer wall for said receptacle, said tray having upwardly-extending walls, at least one of which terminates below the side walls of said receptacle and has rim portion curved inwardly and terminating in a substantially horizontal plane spaced from the bottom wall of said tray.

2. A dump can comprising a receptacle having side walls terminating at their lower edge portions in inwardly-extending retaining ledges, and a tray seated upon said ledges and equipped with perforations in the bottom thereof to provide a bottom strainer wall for said receptacle, said tray having at least some side walls terminating below the side walls of said receptacle and curved upwardly and inwardly to provide curved rim portions, said curved rim portions of said tray having an inner terminal portion substantially horizontal and spaced from and overlying a portion of the bottom of the tray whereby liquids dumped into the tray are rolled back by said substantially horizontal portions toward the center of the tray.

3. A dump can comprising a receptacle having a bottom opening, and a tray member carried by said receptacle and extending over said bottom opening, said tray member having a perforated bottom aligned with said opening, said tray having upwardly and inwardly-extending walls shorter than the upwardly-extending side walls of said receptacle, the inwardly-extending walls of said tray terminating in a generally horizontal plane and at a point overlying the outer peripheral portion of the tray bottom whereby liquids poured into said tray are directed by said inwardly-extending and generally-horizontal tray portions inwardly toward the center of said tray to prevent the splashing of liquid outside of said receptacle.

VERGIL SCHWARZKOPF.

REFERENCES CITED

The following references are of record in the file of this patent:

UNITED STATES PATENTS

| Number | Name | Date |
|---|---|---|
| 1,116,260 | Foster | Nov. 3, 1914 |
| 2,414,212 | Schwarzkopf | Jan. 14, 1947 |

FOREIGN PATENTS

| Number | Country | Date |
|---|---|---|
| 360,486 | France | 1906 |
| 42,007 | Germany | 1887 |
| 19,716 | Sweden | 1905 |